United States Patent

Gondard et al.

[11] Patent Number: 5,219,949
[45] Date of Patent: Jun. 15, 1993

[54] PROCESS FOR CROSS-LINKING ESTERIFIED (CO)POLYMERS

[75] Inventors: Christian Gondard, Roanne; Alain Michel, Lyons, both of France

[73] Assignees: Centre National de la Recherche Scientifique, Paris; Sotra Industries, Andresy, both of France

[21] Appl. No.: 793,424
[22] PCT Filed: Apr. 6, 1991
[86] PCT No.: PCT/FR91/00314
§ 371 Date: Dec. 13, 1991
§ 102(e) Date: Dec. 13, 1991
[87] PCT Pub. No.: WO91/16373
PCT Pub. Date: Oct. 31, 1991

[30] Foreign Application Priority Data

Apr. 17, 1990 [FR] France ................. 90 04896

[51] Int. Cl.$^5$ .................. C08F 8/44; C08F 20/18; C08L 33/08; C08L 33/06
[52] U.S. Cl. .................. 525/330.2; 525/176; 525/195; 525/229; 525/329.7; 525/330.3; 525/330.6
[58] Field of Search .......... 525/176, 195, 229, 329.7, 525/330.2, 330.3, 330.6

[56] References Cited

FOREIGN PATENT DOCUMENTS

| 0218626 | 2/1985 | Fed. Rep. of Germany. | |
| 2059168 | 5/1971 | France | 525/330.6 |
| 0203324 | 10/1983 | German Democratic Rep. | 525/330.6 |

Primary Examiner—Paul R. Michl
Assistant Examiner—Peter Szekely
Attorney, Agent, or Firm—Browdy and Neimark

[57] ABSTRACT

A process for cross-linking (co)polymers having ester functions involves reacting a polyalcohol-derived polyester and a polyacid-derived polyester in the presence of an alkaline alcoholate at a temperature in excess of 180° C.

19 Claims, No Drawings

PROCESS FOR CROSS-LINKING ESTERIFIED (CO)POLYMERS

FIELD OF INVENTION

The present invention relates to a process for cross-linking esterified (co)polymers, cross-linkable compositions and formed objects.

BACKGROUND

The cross-linking of a thermoplastic is a preferred way of improving its resistance to plastic flow over a wider temperature range and, consequently, for obtaining better dimensional stability of shaped objects.

Several processes have been proposed for cross-linking thermoplastics such as polyvinyl chloride and polyolefins. These processes are based on radical-like reactions, condensation reactions, or nucleophilic substitution reactions.

Therefore to bring about the cross-linking of polyethylene the SIOPLAST process of Dow Chemical proposes the radical-like grafting of vinyl monomers containing alkoxysilane groups which lead, by hydrolysis, to silanol groups which by polycondensation bring about the cross-linking of polyethylene. This process is used in the industrial field in cable manufacturing. However, it has the disadvantage of causing a cross-linking density gradient because this is controlled by the diffusion of water in the finished object, water which is necessary for the hydrolysis reaction of the alkoxysilane functions.

For cross-linking polyvinyl chloride, there have been developed processes following a photochemical route, an electronic bombardment and by gamma radiation by subjecting the polymer to these radiations in the presence of a multifunctional monomer such as for example tetraethylene glycol dimethacrylate or trimethylol propane trimethacrylate, the cross-linking reaction being provided by grafting and polymerization of these monomers on the polymer skeleton.

The major disadvantages of these processes are the sensitivity of polyvinyl chloride viz-a-viz these radiations which bring about its degradation by elimination of HCl in a cascade process, and also the presence of a large quantity of monomer to obtain effective and homogeneous cross-linking which has the consequence of modifying its intrinsic properties. The processes by gamma radiation and electronic bombardment require moreover a high level of technology and expensive apparatus which limits their wide-spread use.

To overcome these disadvantages processes have been proposed for polyvinyl chloride which require a nucleophilic substitution reaction of the chlorine atoms by alkali or alkaline-earth thiolates or by mixed thiolate-alkaline or alkaline-earth carboxylate compounds. These processes are well adapted for bringing about cross-linking on a coating line, but they have the major disadvantage of strongly sensitizing the cross-linked material to photochemical degradation induced by traces of disulphides which are always present and are difficult to eliminate in the presence of thiol compounds. For this reason the development of these processes has not become wide-spread.

The European Patent No. 0,032,587 proposes a cross-linking process for acrylic ester copolymers by diols, or diesters of diols, in the presence of a titanate of general formula Ti(OR)4 wherein, the four OR groups can be identical or different. The presence of titanate in the cross-linked material can lead under the action of humidity to the formation of $TiO_2$, a well-know catalyst of photo-oxidation reactions. This can therefore be a major disadvantage to the use of such materials outside.

The British Patent No. 907,775 describes a process for treating polyvinyl acetate with a metal alcoholate of formula M(OR)n, wherein M can be in particular titanium or tin, the reaction is carried out at 80° C. in a solvent and leads to a substitution of the acetate radicals by titanate or stannate radicals which leads to the formation of an organometal polymer.

Therefore a cross-linking process for thermoplastic polymers or copolymers is still being sought which is simple, inexpensive, results in materials which are not sensitive to photochemical aging and which can be integrated into forming operations on an industrial production line such as extrusion, calandering, coating, injection and thermoforming.

SUMMARY OF INVENTION

The present invention fulfils these requirements. In fact a subject of it is a cross-linking process for polymers or copolymers containing ester functions, alone or mixed with others, which can be integrated into industrial working operations by extrusion, injection, calendering, coating or thermoforming and which does not contain metal compounds having known photo-catalytic properties.

This is why a subject of the present Application is a cross-linking process for (co)polymers containing ester functions characterized in that a polyester deriving from a polyol and a polyester deriving from a polyacid are reacted in the presence of an alkaline alcoholate at a temperature greater than 180° C.

DETAILED DESCRIPTION OF EMBODIMENT

According to the invention, by the term polyester deriving from a polyol or alternatively "fully or partially esterified polyol" is meant the polymers and copolymers of vinyl acetate as well as the polyesters of molecules containing at least two alcohol functions. These latter molecules contain for example 2 to 20 carbon atoms, and can be of great variety. There can be mentioned diols, notably alkane-diols such as ethylene glycol or propane diol; polyols, notably triols such as glycerol or trimethylol propane. Oses or osides such as glucose, fructose, starch; derivatives such as polyvinyl alcohol; polymers or copolymers containing ethyl hydroxy acrylate functions for example.

According to the invention, by the term "polyester deriving from a polyacid" or alternatively "fully or partially esterified polyacid" is meant the polymers and copolymers of acrylic or methacrylic esters as well as the polyesters of molecules containing at least two acid functions such as phthalic, adipic, succinic, maleic acids, acids from the Krebs cycle etc. . . .

The (poly)esters of the above derivatives are preferably esters of low molecular weight, lower than 1,000, notably less than 300, such as methyl, ethyl, propyl esters etc. . . .

In the preferred conditions of implementation of the process described above, the alcoholate is dispersed in the polymer matrix using one of its solvents.

The preferred processes according to the invention are characterized in that:

the polyester derivative of a polyol is a (co)polymer of vinyl acetate.

the derivative of a polyacid is a (co)polymer deriving from (meth)acrylic acid.

Also a subject of the invention is cross-linkable compositions which can be produced by the process described according to the present invention. This is why a subject of the present Application is also a cross-linkable composition characterized in that contains a polyester deriving from a polyol, a polyester derivative of a polyacid and an alkaline alcoholate.

The preferred compositions according to the present invention are characterized in that they contain in addition a solvent for the alcoholate.

Particularly subject of the present invention are cross-linkable compositions characterized in that the polyester deriving from a polyol is a (co)polymer of vinyl acetate, notably a copolymer of vinyl acetate and PVC and those characterized in that the polyester deriving from a polyacid is a (co)polymer deriving from (meth)acrylic acid, notably a copolymer of PVC or ethylene and an ester of (meth)acrylic acid.

When it is stated that a composition contains a certain product, it is meant that it contains at least one product of this type, for example at least one polyester deriving from a polyol. For example a mixture of two different polyesters deriving from polyols could be reacted with a polyester deriving from a polyacid.

In the case of the use of copolymers, the comonomers can be in variable respective proportions.

The compositions according to the invention can moreover contain adjuvants normally used in the plastic materials industry: fillers, plasticizers, anti-oxidants, stabilizers, pigments, colouring agents, etc. These constituents can be added at the start of the process during the stage when the cross-linkable products are mixed.

An advantage according to the invention is the control and adaptation of the cross-linking density as a function of the desired properties by controlling the concentration of the reactive types of cross-linkable composition and the composition of polymers and copolymers of vinyl acetate and acrylic and methacrylic esters.

According to an advantage of the invention, the cross-linking temperature can be adapted as a function of the process for producing the compositions relevant to this invention such that cross-linking is not too far advanced in the forming phase of standard processes such as extrusion, calandering, injection, coating and moulding, the cross-linking being finished after the forming stage, for example in a cooling jig or inside a mould in the case of injection, by adjusting the time and temperature parameters.

According to the invention, the plastic flow resistance properties and the dimensional stability of fashioned polymer objects will be clearly improved after cross-linking.

According to the invention the co-cross-linking of a mixture of polymers or copolymers of vinyl acetate with copolymers of acrylic esters is also a means of stabilizing these mixtures with respect to segregation phenomena.

Finally the invention relates to formed objects, characterized in that they are prepared from products obtained by the implementation of the process described above, as well as formed objects constituted by a composition as defined above.

The following examples illustrate the invention without however limiting it.

The cross-linking of polymers, copolymers, mixtures of polymers and/or copolymers and cross-linkable compositions according to the invention is characterised using a dynamic phase Haake plastograph, equipped with a Rheomix 600 type internal mixer of 60 ml capacity. This apparatus allows the continual monitoring of the evolution of the load moment exerted by the polymer on the mixer blades. The cross-linking of the polymer causes an increase in the viscosity of the molten state and consequently an increase in the moment observed after thickening or melting of the polymer. The variation in the moment $\Delta M$ between the moment attained after thickening or melting (Mmin) and the maximum moment (Mmax) attained at the end of the experiment is one criterion of cross-linking.

Two other criteria have been used to evaluate the dynamic-phase reaction kinetics: the time Ti at the end of which an increase in the load moment is produced, which is characteristic of significant cross-linking, and the speed of increase of the moment between the maximum value (Mmax) and the minimum value (Mmin) considered as to the averagespeed of cross-linking.

Another criterion characterizing the degree of cross-linking of a polymer is the percentage of polymer which is insoluble in one of the solvents, for example, tetrahydrofuran (THF) for copolymers of vinyl chloride and vinyl acetate or acrylic and methacrylic esters.

The cross-linking of polymers, copolymers and mixtures of polymers or copolymers and compositions according to the invention has also been monitored in static conditions using a heated-plate press after thickening or melting in a Haake plastograph equipped with a Rheomix 600 internal mixer to obtain good homogenization of the reagents and (co)polymers. After this first phase is completed, the thickened or molten material is transferred into a 3 mm thick rectangular mould which itself is placed between the plates of a heated press.

After a curing time at a given temperature, generally 5 minutes, the moulded plate is quickly cooled down. The degree of cross-linking in these conditions is evaluated by the proportion of polymer which is insoluble in one of its solvents and/or the swelling rate in this solvent, defined by the relationship:

$$S = \frac{(Ms - Mf)/\rho s + Mp/\rho p}{Mp/\rho p}$$

Ms being the mass of the swollen sample, Mp the mass of insoluble polymer, $\rho s$ and, $\rho p$ being the respective volumetric masses of solvent and polymer. For THF $\rho s = 0.948$ g/cm$^3$ and for polyvinyl chloride, $\rho p = 1.38$ g/cm$^3$.

In all the following examples the thermal stabilizer used is isooctyl dioctyl tin dithioglycolate at the rate of 2 g per 100 g of polymer.

Tables 1 and 2 (Examples 1 to 14) illustrate the cross-linking of vinyl chloride - vinyl acetate copolymers by diacid diesters (mole of diester/mole of acetate unit=0.41) in dynamic phase at 200° C., and group together the examples of cross-linking of copolymers of vinyl chloride and vinyl acetate such as diesters of phthalic, isophthalic, succinic and adipic acid in the presence of sodium methylate or sodium ethylate dispersed in the polymer matrix using solvents such as butyl carbitol or sulpholane. These examples show that the methyl esters of phthalic and adipic acid are more effective for the cross-linking of vinyl chloride - vinyl acetate copolymers and when the acetate content of the copolymer diminishes the dimethyl adipate remains the most effective cross-linking agent if one is referring to the average speed of cross-linking.

For all the examples recorded in these tables, with the exception of Example 4, the polymer fraction which is insoluble in tetrahydrofuran at the end of the test is greater than 50%.

Table 3 shows the cross-linking of a vinyl chloride - 2-ethyl-hexyl acrylate copolymer by 1-1-1-trimethylol propane triacetate (content by weight of the copolymer of 2-ethylhexyl acrylate: 12%) in dynamic phase at 205° C.

The two examples of Table 3 show the cross-linking of vinyl chloride - 2-ethyl-hexyl acrylate copolymers by trimethylol propane triacetate. For Example 15 the content of polymer which is insoluble in tetrahydrofuran is lower than 50% and it is over 50% for Example 16.

Table 4 illustrates the co-cross-linking in the dynamic phase at 205° C. of mixtures of vinyl chloride - vinyl acetate copolymers and vinyl chloride - 2-ethyl-hexyl acrylate copolymers, and groups together the examples which illustrate the co-cross-linking of mixtures of vinyl chloride - vinyl acetate copolymers and vinyl chloride - 2-ethyl-hexyl acrylate copolymers in the presence of sodium ethylate. Example 17 shows the strong reactivity of the mixture of a vinyl chloride - vinyl acetate copolymer and a vinyl chloride - 2-ethyl-hexyl acrylate copolymer when the acrylate content is 23%; for Examples 17, 18 and 19 the polymer content which is insoluble in tetrahydrofuran at the end of the experiment is greater than 50%.

For test 20 which was carried out with a copolymer of vinyl chloride - vinyl acetate at 4% by weight, the fraction of polymer which is insoluble in tetrahydrofuran at the end of the test is lower than 50%.

These examples show the wide range of mixtures of vinyl chloride-vinyl acetate copolymers and vinyl chloride-acrylic ester copolymers that it is possible to cross-link according to the invention.

Table 5 shows the co-cross-linking in the static phase of vinyl chloride - vinyl acetate copolymers and vinyl chloride - 2-ethyl-hexyl acrylate copolymers (sodium ethylate $19.0.10^{-2}$ mole (a catalytic amount) per kg of copolymer - sulpholane $16.24.10^{-2}$ mole per kg of polymer); curing time under press 5 min. at 205° C., and groups together the examples of cross-linking in static phase at 205° C. of different mixtures of vinyl chloride - vinyl acetate copolymer and vinyl chloride - 2-ethyl-hexyl acrylate copolymer in the presence of sodium ethylate covering a large composition range. For all these examples the polymer content which is insoluble in tetrahydrofuran is comprised between 95 and 100% after 5 minutes of curing at 205° C. which proves the effectiveness of the process. These examples also show that it is possible to vary the swelling rate of the cross-linked product over a fairly large range (16 to 30) and consequently the process according to the present invention allows the obtaining of cross-linked materials with a large range of properties.

Table 6 illustrates the co-cross-linking in dynamic phase of vinyl chloride - vinyl acetate copolymers and acrylic ester polymers and copolymers. (For Examples 28 and 29 the temperature is 205° C., and for Examples 30 and 31 the temperature is 200° C.), and groups together examples of cocross-linking of vinyl chloride - vinyl acetate copolymer with either ethyl polyacrylate, or a butyl and methyl acrylate copolymer, or ethylene and ethyl or butyl acrylate copolymers. For Examples 28 and 29 the fraction of polymer which is insoluble in tetrahydrofuran is greater than 50% at the end of the test. For Examples 30 and 31, the polymer content which is insoluble in toluene at 110° C. is greater than 50% at the end of the test. The short induction times and high cross-linking speeds for Examples 30 and 31 also show the high reactivity of these cross-linking systems in the presence of sodium alcoholate.

TABLE 1

| EX | Diester | Cross-linking system | | | sulpholane | Content by weight of acetate of PVC vinyl acetate copolymer % | $T_m$ mn | $T_i$ mn | $\Delta M$ N·m | $S_C$ Nm·mn$^{-1}$ |
|---|---|---|---|---|---|---|---|---|---|---|
| | | sodium methylate (mole/Kg | sodium ethylate Polymer × | butyl carbitol $10^2$) | | | | | | |
| 1 | dimethyl phthalate | 24.1 | | 20.1 | | 11 | 9 | 4 | 22 | 4.5 |
| 2 | diethyl phthalate | 24.1 | | 20.1 | | 11 | 11.5 | 4.5 | 22 | 3.1 |
| 3 | dibutyl phthalate | 24.1 | | 20.1 | | 11 | 14 | 4.5 | 23 | 2.4 |
| 4 | 2-ethyl hexyl phthalate | 24.1 | | 20.1 | | 11 | 20 | 20 | 5 | 0 |
| 5 | dimethyl isophthalate | 24.1 | | 20.1 | | 11 | 14 | 4 | 16 | 1.7 |
| 6 | dimethyl succinate | 24.1 | | 20.1 | | 11 | 20 | 13 | 10 | 1.4 |
| 7 | dimethyl adipate | 24.1 | | 20.1 | | 11 | 6.5 | 2.5 | 20 | 5.0 |
| 8 | dimethyl phthalate | | 19.0 | | 22.5 | 11 | 11 | 4.5 | 20 | 3.1 |
| 9 | dimethyl phthalate | | 19.0 | | 22.5 | 6 | 12 | 5 | 18 | 2.5 |
| 10 | dimethyl phthalate | | 19.0 | | 22.5 | 4 | 12 | 6 | 2 | 0.3 |

TABLE 2

| EX | Diester | Cross-linking system sodium methylate (mole/Kg Polymer × $10^2$) | Cross-linking system sodium ethylate | Cross-linking system butyl carbitol sulpholane | Content by weight of acetate of PVC vinyl acetate copolymer % | $T_m$ mn | $T_i$ mn | $\Delta M$ N·m | $S_C$ Nm·$mn^{-1}$ |
|----|---------|---|---|---|---|---|---|---|---|
| 11 | dimethyl adipate | 19.0 | | 22.5 | 11 | 7.5 | 2.5 | 21 | 4.2 |
| 12 | dimethyl adipate | 19.0 | | 22.5 | 6 | 9 | 5 | 15 | 3.7 |
| 13 | dimethyl adipate | 19.0 | | 22.5 | 4 | 7.5 | 4.5 | 6 | 2 |
| 14 | dimethyl phthalate | 24.1 | | 22.5 | 11 | 10 | 4.5 | 24 | 4.3 |

TABLE 3

| Ex | Sodium Methylate | Butyl carbitol | Molar ratio | mole/kg of polymer × $10^2$ | acetate/acrylate | $T_m$ mn | $T_i$ mn | $\Delta M$ N·m | $S_C$ N·m·$mn^{-1}$ |
|----|---|---|---|---|---|---|---|---|---|
| 15 | | | | 24.1 | 20.1 | 2.05 | 12.5 | 5 | 5 | 0.66 |
| 16 | | | | 24.1 | 20.1 | 1.65 | 9 | 4 | 18 | 3.6 |

TABLE 4

| Ex | Sodium ethylate Mole/Kg of copolymer × $10^2$ | Sulpholane | Vinyl acetate content of copolymer PVC-acetate % | 2-ethyl-hexyl content of copolymer PVC-acrylate % | Composition of mixture of copolymers PVC acetate % | Composition of mixture of copolymers PVC acryl. % | $T_m$ mn | $T_i$ mn | $\Delta C$ | $V_R$ N·m·$mn^{-1}$ |
|----|---|---|---|---|---|---|---|---|---|---|
| 17 | 19 | 22.5 | 11 | 23 | 67.5 | 32.5 | 6 | 3.5 | 18 | 10.4 |
| 18 | 19 | 22.5 | 11 | 12 | 50 | 50 | 8 | 5 | 12 | 4 |
| 19 | 19 | 22.5 | 6 | 12 | 64.5 | 35.5 | 8 | 4.5 | 14 | 4 |
| 20 | 19 | 22.5 | 4 | 12 | 73 | 27 | 8 | 5 | 12 | 4 |

TABLE 5

| Ex | copolymer-PVC vinyl acetate (11%) | copolymer-PVC 2-ethyl-hexyl acrylate (12%) | copolymer PVC 2-ethyl-hexyl acrylate (23%) | Molar ratio acetate/acrylate | Swelling rate in cyclohexanone after 144 hrs |
|----|---|---|---|---|---|
| 21 | 33 | 57 | | 1.48 | 24 |
| 22 | 50 | 50 | | 1.93 | 21 |
| 23 | 60 | 40 | | 2.96 | 20 |
| 24 | 70 | 30 | | 4.68 | 30 |
| 25 | 60 | | 40 | 1.54 | 21 |
| 26 | 57.5 | | 32.5 | 2.15 | 16 |
| 27 | 75 | | 25 | 3.09 | 23 |

TABLE 6

| EX | copolymer PVC-vinyl acetate (11%) | ethyl polyacrylate | copolymer butyl acrylate (50%) methyl acrylate (50%) | ethylene ethyl acrylate (9%) | copolymer butyl acrylate (17%) |
|----|---|---|---|---|---|
| 28 | 88.6 | 11.4 | | | |
| 29 | 75.3 (copolymer PVC-vinyl acetate (26%)) | | 24.7 | | |
| 30 | 27 | | | 73 | |
| 31 | 30 | | | | 70 |

| Ex | sodium ethylate mole/Kg of polymer × $10^2$ | sodium methylate | sulpholane | butyl carbitol | $T_m$ mn | $T_i$ mn | $\Delta M$ N·m | $S_C$ n·m·$mn^{-1}$ |
|----|---|---|---|---|---|---|---|---|
| 28 | 19 | | 22.5 | | 5.5 | 4 | 10 | 6.6 |
| 29 | 19 | | 22.5 | | 5 | 3.5 | 16 | 10.6 |
| 30 | | 37.0 | 22.5 | | 1 | 1 | 30 | 30 |
| 31 | | 37.0 | | 14.9 | 1 | 1 | 19 | 19 |

We claim:

1. Cross-linking process of (co)polymers containing ester functions, characterized in that an esterified polyol and an esterified polyacid are reacted in the presence of a catalytic amount of an alkaline alcoholate at a temperature greater than 180° C., wherein said esterified polyol is a polymer of vinyl acetate or a monomer containing at least two alcohol functions, and wherein said esterified polyacid is a polymer of an acrylic ester, a methacrylic ester or an acid containing at least two acid functions.

2. Process according to claim 1, characterized in that the alcoholate is dispersed in the polymer matrix using one of its solvents.

3. Process according to claim 1, characterized in that the esterfied polyol is a (co)polymer of vinyl acetate.

4. Process according to claim 1, characterized in that the esterified polyacid is a (co)polymer deriving from (meth)acrylic acid.

5. Cross-linkable composition, characterized in that it contains an esterified polyol, a polyester derived from a polyacid and a catalytic amount of an alkaline alcoholate, wherein said esterified polyol is a polymer of vinyl acetate or a monomer containing at least two alcohol functions, and wherein said esterified polyacid is a polymer of an acrylic ester, a methacrylic ester or an acid containing at least two acid functions.

6. Composition according to claim 5, characterized in that in addition it contains a solvent for the alcoholate.

7. Composition according to claim 5, characterized in that the esterified polyol is a (co)polymer of vinyl acetate.

8. Composition according to claim 5, characterized in that the esterified polyacid is a (co)polymer deriving from (meth)acrylic acid.

9. Former objects, characterized in that they are prepared from products obtained by the implementation of the process according to claim 1.

10. Formed objects, characterized in that they are constituted by a composition according to claim 5.

11. Composition according to claim 7, wherein said copolymer is a copolymer of said vinyl acetate with PVC.

12. Composition according to claim 8, wherein said copolymer is a copolymer of PVC or ethylene with an ester of said (meth)acrylic acid.

13. Process according to claim 2, characterized in that the esterified polyol is a (co)polymer of vinyl acetate.

14. Process according to claim 2, characterized in that the esterified polyacid is a (co)polymer deriving from meth( )acrylic acid.

15. Process according to claim 3, characterized in that the esterified polyacid is a (co)polymer deriving from meth( )acrylic acid.

16. Composition according to claim 6, characterized in that the esterified polyol is a (co)polymer of vinyl acetate.

17. Composition according to claim 16, characterized in that the esterified polyacid is a (co)polymer of PVC or ethylene and an ester of (meth)acrylic acid.

18. Composition according to claim 6, characterized in that the esterified polyacid is a (co)polymer of PVC or ethylene and an ester of (meth)acrylic acid.

19. A cross-linked copolymer obtained by the process of claim 1, comprising cross-linking bridges extending between said esterified polyol and said esterified polyacid.

* * * * *

UNITED STATES PATENT AND TRADEMARK OFFICE
CERTIFICATE OF CORRECTION

PATENT NO. : 5,219,949
DATED : Jun. 15, 1993
INVENTOR(S) : GONDARD et al.

It is certified that error appears in the above-identified patent and that said Letters Patent is hereby corrected as shown below:

On the title page, Item

"[22] PCT Filed: Apr 6, 1991"

and insert therefore

--[22] PCT Filed Apr 16, 1991--

Signed and Sealed this

Third Day of May, 1994

Attest:

BRUCE LEHMAN

*Attesting Officer*  *Commissioner of Patents and Trademarks*